US006999782B2

(12) United States Patent
Shaughnessy et al.

(10) Patent No.: US 6,999,782 B2
(45) Date of Patent: Feb. 14, 2006

(54) METHOD FOR JOINING DISPATCH CALLS

(75) Inventors: Mark L. Shaughnessy, Phoenix, AZ (US); Peter J. Armbruster, Chandler, AZ (US); James P. Krakora, Gilbert, AZ (US); Bradley R. Schaefer, Chandler, AZ (US); William Shores, Phoenix, AZ (US)

(73) Assignee: Motorola, Inc., Schaumburg, IL (US)

(*) Notice: Subject to any disclaimer, the term of this patent is extended or adjusted under 35 U.S.C. 154(b) by 177 days.

(21) Appl. No.: 10/371,594

(22) Filed: Feb. 19, 2003

(65) Prior Publication Data

US 2004/0162096 A1 Aug. 19, 2004

(51) Int. Cl.
*H04B 7/00* (2006.01)

(52) U.S. Cl. ...................... 455/518; 455/519; 455/520; 379/142

(58) Field of Classification Search ................ 455/518, 455/519, 520, 521, 458, 524, 526; 379/142, 379/157

See application file for complete search history.

(56) References Cited

U.S. PATENT DOCUMENTS

| | | | | |
|---|---|---|---|---|
| 6,018,668 | A * | 1/2000 | Schmidt | 455/518 |
| 6,662,010 | B1 * | 12/2003 | Tseitlin et al. | 455/426.1 |
| 2002/0102999 | A1 * | 8/2002 | Maggenti et al. | 455/518 |
| 2004/0127233 | A1 * | 7/2004 | Harris et al. | 455/458 |

* cited by examiner

*Primary Examiner*—Sonny Trinh
*Assistant Examiner*—Phuoc Doan
(74) *Attorney, Agent, or Firm*—Frank J. Bogacz; Kevin D. Wills

(57) ABSTRACT

A dispatch call setup method selects (101) either a forced dispatch call (105) or an invite dispatch call (103). The originating unit (20) of the dispatch call may select either option. Depending on how the required target users (30, 40) respond, the originating terminal has the option to complete the call (119). The terminating unit may accept, reject or convert the forced dispatch call (127). Further, the target may establish preset preferences which accept, reject or allow user controls for an invite dispatch call (139).

21 Claims, 3 Drawing Sheets

METHOD FOR JOINING DISPATCH CALLS

BACKGROUND OF THE INVENTION

The present invention pertains to joining dispatch call sessions and more particularly to a method for inviting participants to join a dispatch call.

Today most dispatch push-to-talk calls are forced type calls. That is, once the originator selects the person or persons to that he wishes to speak the selected or target user has the audio of his phone immediately blare out the words of the speaker. Since the target or receiving user has no control of the timing of the receipt of speech, the call is called a forced call. Target callers are forcibly joined into calls by the call processing server of the communication network, which automatically moves the target subscriber device to a bearer channel and connects them to audio or other media that is being sourced by the originating user. These are forced calls. Such forced calls often result in the audio or other media blaring out at the target subscriber's device at inopportune times. For example, a workman working on a project which requires his undivided attention would not wish his dispatch radio to suddenly blare while he was climbing a ladder or balancing on scaffolding.

Furthermore, in modern dispatch calls, each of the target units may not have the ergonomic requirements for receiving a forced dispatch call. That is, computers or certain radio telephones such as the typical cellular phone may not have a high audio capability, such as a speaker phone, and cannot accept forced dispatch calls.

Currently, dispatch phones do not provide the target user with the capability of rejecting forced calls.

Accordingly, it would be highly desirable to have methodology for providing an originating user with the ability to operate in a non-forced mode. Further, it would be highly desirable to provide target users of dispatch calls with the ability to accept or reject such forced or non-forced calls.

DESCRIPTION OF THE PREFERRED EMBODIMENT OF THE INVENTION

Figure 1:
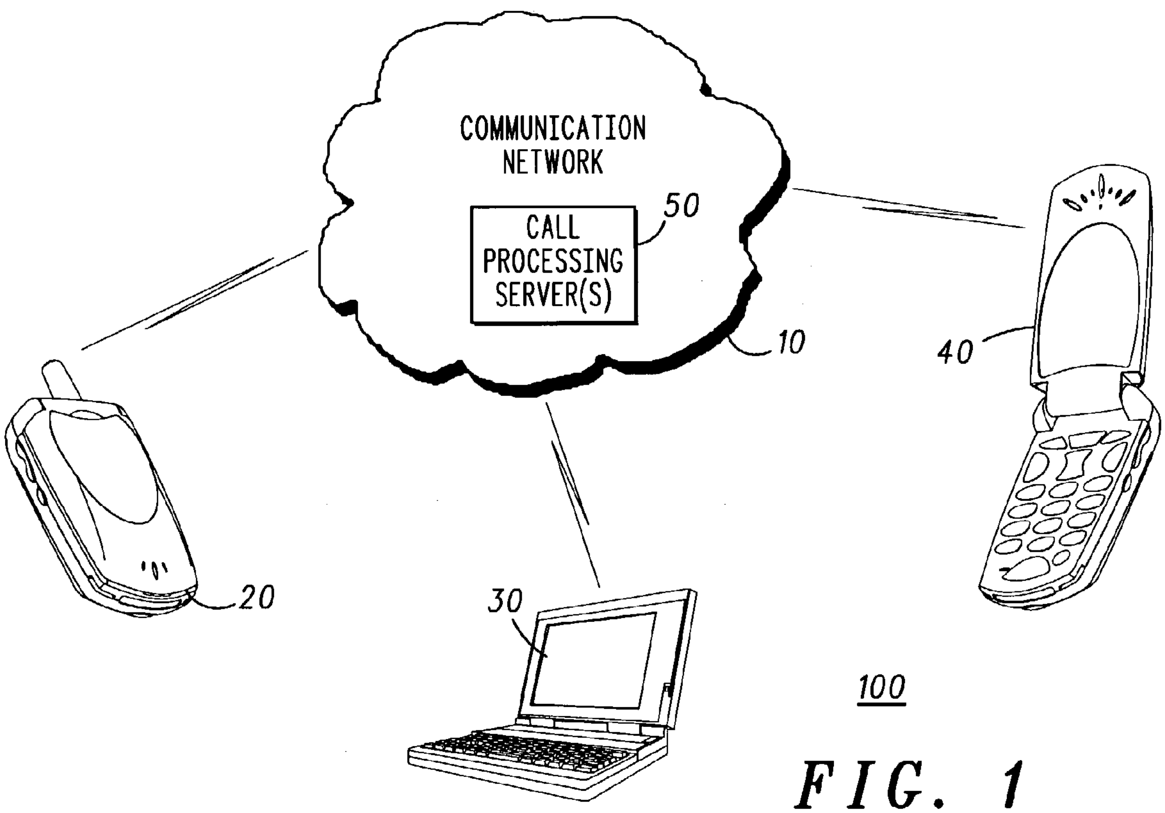
FIG. 1 is a block diagram of a communication network interconnection for supporting dispatch call services.

FIG. 1 depicts a communication system for facilitating dispatch call services. Communication system 100 includes a communication network 10 which has call processing server 50 to facilitate switching and transmission of bearer traffic between terminals 20–40. While a call processing server 50 is shown in the preferred embodiment, it is an optional element. Distributed call processing is also possible where each of the terminals provides necessary origination or termination call processing without the need for a call processing server 50. For purposes of explanation of the present invention, mobile unit 20 will be the originating unit and mobile units 30 and/or 40 will be the target units. Typically originating unit 20 would send a dispatch call request through network 10 and call processing server 50 for target mobile unit 40, for example. Server 50 and network 10 would automatically connect target unit 40 with originating unit 20 and target unit's loudspeaker would begin blaring the communication of originating unit 20. This is termed a forced dispatch call.

Target mobile unit 40 may be in the possession of a user (not shown) who is performing an action which requires his undivided attention, such as climbing a ladder. To have target unit 40 blare a communication from originating unit 20 may startle the user and result in serious injury, etc.

Another kind of dispatch call is an invited dispatch call. The invited dispatch call requires that the target user of the call accept the call before it will be completed and bearer traffic is delivered.

Figure 2:
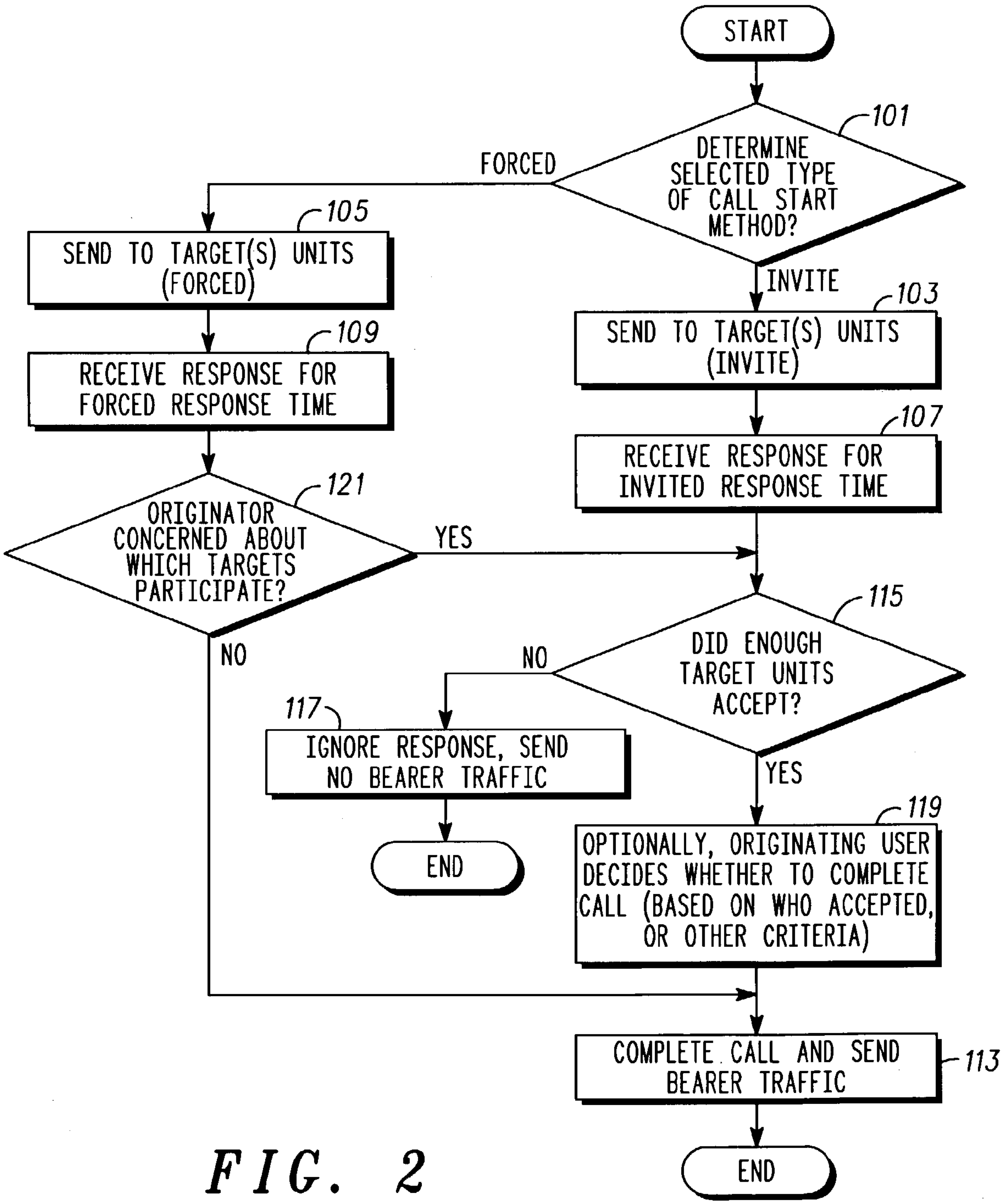
FIG. 2 is a flow chart of a dispatch call method for the originating user.

Referring to FIG. 2, a flow chart of a method for dispatch call setup for originating unit 20 is shown. The method is started and block 101 is entered. Block 101 determines which type of call start method has been selected by the originator. If the dispatch call type is a forced call, block 101 transfers control to block 105. The originating user may have a default dispatch call method if none is selected in real time.

Block 105 sends a forced dispatch call request through network 10 and call processing server 50 to target mobile units 30 and/or 40. For group calls, both target units 30 and 40 would typically be selected. For an individual dispatch call, one or the other of target units 30 or 40 would be selected.

Next, block 109 waits to gather call accept or reject responses from the target units for a configurable period of time which is appropriate for forced call processing. This time may be set to a default in the subscriber device, or it may be controlled by user preference, and would usually be set prior to the call. For forced calls, the time would typically be set to be relatively short, for example 0.5 to 2 seconds, since it is expected that most targets will immediately respond to a forced call request. As another example, if the originator is unconcerned about target party participation (as determined in block 121), then this time may be set to zero to speed call processing.

Next, block 121 determines whether the originating unit 20 is concerned about which target units participate in the call. If the originating unit 20 is not concerned about which of the target units participate in the dispatch call, block 121 transfers control to block 113 via the no path. Such transmission by the originating unit 20 would typically be a broadcast message to a group of target units who are not required to respond in real time.

If the originating unit 20 is concerned about which targets participate in the dispatch call, block 121 transfers control to block 115 via the yes path.

If the selected type of dispatch call start method is the invite, block 101 transfers control to block 103. Block 103 sends an invite request to each of the target user or users via network 10 and call processing server 50.

Next, block 107 waits to gather call accept or reject responses from the target units for a configurable period of time which is appropriate for invited call processing. This time may be set to a default in the subscriber device, or it may be controlled by user preference, and would usually be set prior to the call. For invited calls, the time would typically be set to be longer than for forced calls, for example 10 to 20 seconds, since it is expected that it may take some time for the users of target subscriber units to interact with the subscriber unit and respond to an invited call request.

After responses from the target units have been received, block 107 transfers control to block 115. Typically, invited dispatch calls will include responses from all the target units, but the system 100 may be configured to optionally not provide responses for forced dispatch calls, as described in FIG. 3.

Next, block 115 determines whether enough target users have accepted in order to conduct the dispatch call. The threshold for "enough" target users accepting the call is configurable. It could be set to just one user, for example, for forced calls, if the originator just wants to be sure that at least one target party is listening. Or, it could be set to a percentage of the number of potential group members, e.g. 50%. Or, it could be set to all (100%) of the potential group members to be sure that all desired targets are included in the call. Then, if the configured threshold (or greater) of potential group call targets accept the call, control would be passed to block 119. If not enough users have accepted, block 115 transfers control to block 117 via the no path. Block 117 ignores the responses and sends no bearer traffic. Then the process is ended.

If sufficient target users did respond, block 115 transfers control to optional block 119 via the yes path. Optional block 119 presents the originating user with information about who has accepted the call, for example how many targets accepted the call, which specific targets accepted the call, which specific targets rejected the call, etc. This allows the originating user to make an informed decision about whether to complete the call to the targets, beyond simply knowing that the acceptance threshold, block 115, was reached. If the originator chooses to complete the call, the originating unit begins sending bearer traffic to the target units, block 113. The process is then ended.

Figure 3:
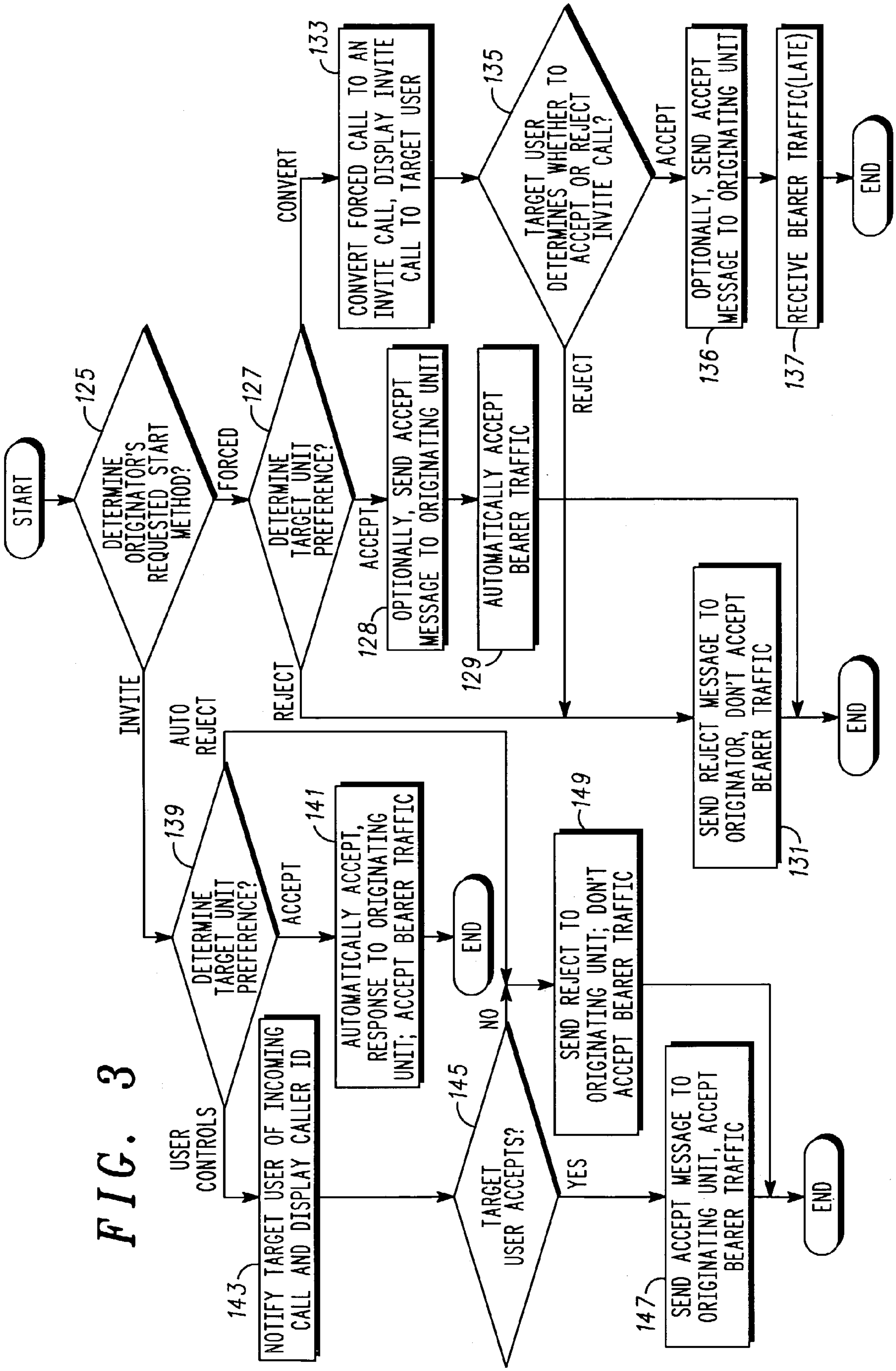
FIG. 3 is a flow chart of a dispatch call setup method for target users in a dispatch call.

Referring to FIG. 3, a flow chart of a dispatch call startup method for target mobile units 30 and 40 is shown. This method allows the target mobile unit 30 and 40 to optionally select the behavior upon receiving either forced or invited dispatch calls. This method allows a user of the target mobile unit to select the preferences that the target mobile unit will exhibit.

The method is started and block 125 is entered. Block 125 determines the originating unit 20's requested dispatch call start method. If a forced dispatch call has been sent by the originating unit 20, block 125 transfers control to block 127. Next, block 127 determines the present preferences of the target user 30 and 40. If the target unit's preferences were set to accept forced dispatch calls, block 127 transfers control to block 129. Block 129 automatically accepts bearer traffic. That is, the originator's audio will be output on the high audio output, typically a speaker, of the target unit 30 and/or 40. An optional step, block 128, before block 129 sends an accept message to the originating unit 20. This allows the originator to make informed decisions regarding which target(s) have accepted the call. However, the originator flow described in FIG. 2 can continue properly without the accept message being sent by the target unit 30 and/or 40. The process is then ended.

If the target unit's preferences are set to reject forced dispatch calls, block 127 transfers control to block 131. Block 131 sends a reject message to the originating unit and does not accept any bearer traffic. The method is then ended.

If the target mobile unit 30 or 40 has its preferences set to convert the forced dispatch call, block 127 transfers control to block 133. Block 133 converts the forced dispatch call to an invite dispatch call and displays the invited call information to a target user. Next, the target user determines whether to accept or reject the invite call, block 135. If the target user has accepted the converted invite call, block 135 transfers control to block 137. Block 137 enables the target unit 30 or 40 to receive the bearer traffic, late. Late indicates that if the incoming dispatch call request was converted by the target unit 30 or 40 at its discretion, then depending upon the originating unit's 10 configuration, the bearer traffic for this call may have begun prior to the time the target user accepts the call. Thus, the target unit 30 or 40 may not receive the entire transmission, but this typically will be a minimal portion of the bearer traffic. An optional step, block 136, before block 137 sends an accept message to the originating unit 20. This allows the originator to make informed decisions regarding which target(s) have accepted the call. However, the originator flow described in FIG. 2 can continue properly without the accept message being sent by the target unit 30 and/or 40. The method is then ended.

If the target user determines to reject the converted dispatch call, block 135 transfers control to block 131. Block 131 sends a reject message to the originating unit 20 and does not accept any bearer traffic. The process is then ended.

If the target unit 30 or 40 has determined that the originator's requested dispatch call request was an invite request, block 125 transfers control to block 139. Block 139 determines the preferences of the target unit. If the target units 30 or 40 preference is set to automatically accept, block 139 transfers control to block 141. Block 141 automatically accepts the invite dispatch call and responds to the originating unit with an accept message. The target unit 30 and/or 40 then accepts bearer traffic. The method is then ended.

If the target unit's 30 or 40 preference is set to automatically reject an invited dispatch call, block 139 transfers control to block 149. Block 149 sends a reject message to the originating unit and does not accept any bearer traffic. The method is then ended.

If the preferences of the target unit 30 or 40 are set to indicate that the user controls the response in real time, block 139 transfers control to block 143. Block 143 notifies the target user of the incoming invited dispatch call and displays caller ID type information. Next, block 145 determines whether the target user has accepted the invited dispatch call. If the target user does not accept the invite dispatch call in real time, block 145 transfers control to block 149 via the no path. Block 149 sends a reject message to the originating unit and does not accept any bearer traffic. If the target user accepts the invite dispatch call, block 145 transfer control to block 147 via the yes path. Block 147 sends an accept message to the originating unit 20 and accepts the bearer traffic when it is sent. The method is then ended.

All preferences mentioned above may be temporary settings which the user of the mobile unit may change depending upon current communication needs and the user's activities. Further, the target unit's behavior can be automatically set based on the capabilities of the dispatch platform used as the target unit. For example, if the platform does not accept or support high audio capability, then the target dispatch unit may be set never to accept forced dispatch calls.

SUMMARY TABLE

| | Target Preference Any Call Type | Target Preference Invite Only | Target Preference Forced Only |
|---|---|---|---|
| Originator Invite Call | Call Accepted | Call Accepted | Call Accepted (Auto Accepted by Target Device) |

-continued

SUMMARY TABLE

| | Target Preference Any Call Type | Target Preference Invite Only | Target Preference Forced Only |
|---|---|---|---|
| Originator Forced Call | Call Accepted | Call either Rejected or Converted to Invite at Target. | Call Accepted |

Note:
This table outlines actions without the Call Processing server converting call types.

As can be seen from the above explanation, the present invention provides new service level capabilities for mobile dispatch users. Both originating and target users may flexibly set their preferences for handling both invited and forced dispatch calls. These features include setting default values for call start methods; automatically accepting or rejecting forced or invited dispatch calls; and supporting particular logistics associated with displaying invite dispatch calls. These advantages allow the dispatch call function great flexibility and provide for a more tailored user experience (for example, white collar vs. blue collar environments), and enhanced safety of target users.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A dispatch call setup method for a dispatch call between an originating unit and at least one target unit via a communication network, the dispatch call setup method comprising the steps of:

sending an dispatch call message to the at least one target unit, the dispatch call message having a selected dispatch call setup type selected between a forced message and an invited message at the originating unit;

determining whether a response from the at least one target unit is sufficient for the dispatch call; and if the response from the at least one target unit is sufficient completing the dispatch call between the originating unit and the at least one target unit.

2. The method for dispatch call setup as claimed in claim 1, wherein: the dispatch call message including a selected dispatch call setup type of an invite message; and if the response of the at least one target unit is insufficient, there is further included steps of: ignoring the response of the at least one target unit; and ending the call.

3. The method for dispatch call setup as claimed in claim 2, wherein if the at least one target unit accepted the invite message, there is further included steps of: completing the dispatch call between the originating unit and the at least one target unit via the communication network; and sending bearer traffic.

4. The method for dispatch call setup as claimed in claim 3, wherein there is further included a step of receiving at least one response from the at least one target unit after the step of sending the invite message.

5. The method for dispatch call setup as claimed in claim 4, wherein there is further included a step of determining the selected dispatch call setup type.

6. The method for dispatch call setup as claimed in claim 5, wherein if the selected dispatch call setup type is a type for an invite message, the steps of: sending an call start message; receiving a response from the at least one target unit; if the response from the at least one target unit is sufficient, completing the dispatch call.

7. The method for dispatch call setup as claimed in claim 5, wherein if the selected dispatch call setup type is a type for a forced message, there is further included a step of sending a forced message to the at least one target unit.

8. The method for dispatch call setup as claimed in claim 7, wherein after the step of sending the forced message, there is further included the steps of: determining whether the originating unit is concerned whether the at least one target unit participates in a forced dispatch call; and if the originating unit is not concerned, there is further included steps of completing the dispatch call and sending bearer traffic.

9. The method for dispatch call setup as claimed in claim 8, wherein if the originating unit is concerned, there is further included steps of: determining whether a sufficient number of at least one target units accept the forced type of dispatch call; if a sufficient number have accepted, there is further included a step of traffic; and if an insufficient number have accepted, there is further included a step of ending the dispatch call.

10. The method for dispatch call setup for a dispatch call between an originating unit and a target unit-via a communication network, the method comprising the steps of:

receiving by the target unit an invite message for a dispatch call, the dispatch call message having a selected dispatch call setup type selected between a forced message and an invited message at the originating unit;

determining a preset preference of the target unit for the selected dispatch call setup type;

determining whether to accept the invite message based upon the preset preference; and if the invite message is accepted, sending an accept message to the originating unit.

11. The method for dispatch call setup as claimed in claim 10, wherein if it is determined to reject the invite message, there is further included a step of sending a reject message to the originating unit.

12. The method for dispatch call setup as claimed in claim 10, wherein if the preset preference is for a user control, there is further included a step of notifying by the target unit a user of an incoming invite dispatch call.

13. The method for dispatch call setup as claimed in claim 10, wherein if the preset preference is for automatically accepting, there is further included steps of: sending an accept response message to the originating unit; and accepting bearer traffic.

14. The method for dispatch call setup as claimed in claim 10, wherein if the preset preference is for automatically rejecting the invite message, there is further included steps of: sending by the target unit a reject message to the originating unit; and inhibiting acceptance of bearer traffic.

15. The method for dispatch call setup as claimed in claim 14, wherein after the step of sending a response message to the originating unit, there is further included a step of accepting bearer traffic.

16. A method for dispatch call setup for a dispatch call between an originating unit and a target unit via a communication network, the method including the steps of:

determining whether a dispatch call method of the originating unit is a forced dispatch call;

determining by the target unit if a preset preference is to convert the forced dispatch call;

if the preset preference is to convert, converting the forced dispatch call to an invite dispatch call; and if the invite dispatch call is accepted, receiving bearer traffic.

17. The method for dispatch call setup as claimed in claim 16, wherein the step of converting further includes the step of displaying by the target unit the invite dispatch call to a target user.

18. The method for dispatch call setup as claimed in claim 16, wherein there is further included steps of: determining whether the preset preference of the target unit is to automatically reject the forced dispatch call; if the preset preference is to automatically reject, sending by the target unit a reject message to the originating unit; and inhibiting bearer traffic by the target unit.

19. The method for dispatch call setup as claimed in claim 16, wherein if it is determined that the preset preference is to automatically accept the forced dispatch call, there is further included a step of automatically accepting bearer traffic.

20. The method for dispatch call setup as claimed in claim 16, wherein there is further included a step of dynamically selecting the preset preference.

21. The method for dispatch call setup as claimed in claim 16, wherein prior to the step of receiving bearer traffic there is further included a step of sending an accept message to the originating unit.

* * * * *